United States Patent
Yoneda et al.

(10) Patent No.: US 12,514,943 B2
(45) Date of Patent: Jan. 6, 2026

(54) OXIDANT COMPOSITION FOR SUPPRESSING LOSS OF ADHESIVE DURABILITY, AND USE OF SAME

(71) Applicant: SARAYA CO., LTD., Osaka (JP)

(72) Inventors: Tomonori Yoneda, Kashiwara (JP); Hiroaki Yoshikawa, Kashiwara (JP); Satomi Sakai, Kashiwara (JP); Madan Mali, Kashiwara (JP); Emiko Kawamukai, Kashiwara (JP)

(73) Assignee: SARAYA CO., LTD., Osaka (JP)

( * ) Notice: Subject to any disclaimer, the term of this patent is extended or adjusted under 35 U.S.C. 154(b) by 545 days.

(21) Appl. No.: 17/998,187

(22) PCT Filed: May 14, 2021

(86) PCT No.: PCT/JP2021/018507
§ 371 (c)(1),
(2) Date: Nov. 8, 2022

(87) PCT Pub. No.: WO2021/230376
PCT Pub. Date: Nov. 18, 2021

(65) Prior Publication Data
US 2023/0211031 A1  Jul. 6, 2023

(30) Foreign Application Priority Data

May 15, 2020 (JP) .................................. 2020-086296
Oct. 30, 2020 (JP) .................................. 2020-183267

(51) Int. Cl.
| | | |
|---|---|---|
| *A61L 2/00* | (2006.01) | |
| *A01N 25/02* | (2006.01) | |
| *A01N 37/16* | (2006.01) | |
| *A01N 59/00* | (2006.01) | |
| *A01P 1/00* | (2006.01) | |
| *A61L 2/18* | (2006.01) | |
| *A61L 2/26* | (2006.01) | |
| *A61L 9/00* | (2006.01) | |
| *A61L 101/34* | (2006.01) | |

(52) U.S. Cl.
CPC .............. *A61L 2/186* (2013.01); *A01N 25/02* (2013.01); *A01N 37/16* (2013.01); *A01N 59/00* (2013.01); *A01P 1/00* (2021.08); *A61L 2/26* (2013.01); *A61L 2101/34* (2020.08); *A61L 2202/12* (2013.01); *A61L 2202/15* (2013.01); *A61L 2202/20* (2013.01)

(58) Field of Classification Search
CPC ........ A61L 2/18; A61L 101/22; A61L 101/36; A01N 37/16
USPC ..................................................... 422/28, 32
See application file for complete search history.

(56) References Cited

U.S. PATENT DOCUMENTS

| | | |
|---|---|---|
| 5,077,008 A | 12/1991 | Kralovic et al. |
| 5,900,256 A | 5/1999 | Scoville, Jr. et al. |
| 6,448,062 B1 | 9/2002 | Huth et al. |
| 6,468,472 B1 * | 10/2002 | Yu ............................ C11D 3/48 134/41 |
| 7,419,645 B2 * | 9/2008 | Brandl ....................... A61L 2/18 422/292 |
| 2008/0054020 A1 | 3/2008 | Pierson et al. |
| 2008/0121154 A1 | 5/2008 | Memory |
| 2010/0108942 A1 | 5/2010 | Man et al. |
| 2014/0322349 A1 | 10/2014 | Martin |

FOREIGN PATENT DOCUMENTS

| | | |
|---|---|---|
| CN | 105724381 A1 | 7/2016 |
| EP | 1123655 A1 | 8/2001 |
| JP | 2005-206565 A | 8/2005 |
| JP | 2005-305109 A | 11/2005 |
| JP | 2007-254693 A | 10/2007 |
| JP | 2009-132692 A | 6/2009 |
| WO | WO 2000/022931 A1 | 4/2000 |
| WO | WO 2001/019414 A1 | 3/2001 |

OTHER PUBLICATIONS

Rutala, "APIC Guideline for Selection and Use of Disinfectants," *AJIC*, 24(4): 313-342 (Aug. 1996).
Japan Patent Office, International Search Report in International Patent Application No. PCT/JP2021/018507 (Jun. 15, 2021).
European Patent Office, Extended European Search Report in European Patent Application No. 21804195.2 (May 15, 2024).
Christian et al., "Analytical Chemistry" (Seventh Edition), John Wiley & Sons, Inc., pp. 240-241 and 801 (2013).

* cited by examiner

*Primary Examiner* — Monzer R Chorbaji
(74) *Attorney, Agent, or Firm* — Leydig, Voit & Mayer, Ltd.

(57) ABSTRACT

The disclosure relates to a microbicidal composition with excellent action of limiting a decrease in durability of synthetic adhesives as well as high microbicidal action. The microbicidal composition contains 0.03 to less than 1.0 mass % of peracetic acid, 0.045 to less than 1.5 mass % of hydrogen peroxide, and 0.036 mass % or more of glycine.

17 Claims, No Drawings

OXIDANT COMPOSITION FOR SUPPRESSING LOSS OF ADHESIVE DURABILITY, AND USE OF SAME

TECHNICAL FIELD

The present invention relates to a microbicidal composition that contains an oxidant as an active ingredient and that has action of limiting a decrease in durability of an adhesive, in particular a synthetic adhesive, together with microbicidal action. Thus, the microbicidal composition according to the present invention can be suitably used in the disinfection and microbicidal treatment of test objects containing a synthetic adhesive, in particular instruments and equipment used in the medical field (including the dental field; the same applies below) or food field where disinfection and microbicidal treatment are required.

BACKGROUND ART

Acidic oxidants are widely used as a disinfectant or microbicidal agent in the medical field or food field due to their excellent microbicidal activity against a wide range of microorganisms. In particular, acidic oxidants containing percarboxylic acid such as peracetic acid or hydrogen peroxide can perform disinfection and microbicidal treatment in a short time, and are thus effective disinfectant and microbicidal agents for instruments or environment for which physical disinfection such as autoclaved sterilization or dry-heat sterilization cannot be applied.

However, acidic oxidants are corrosive and thus known to degrade or rust metals such as aluminum and aluminum alloy, which are commonly used, for example, in materials for medical equipment, and interfere with the functionality and appearance of the metals. To decrease the corrosion of metals, for example, chromate or molybdate is used as a corrosion inhibitor (see PTL 1). However, these components are not practical because they are subject to the Pollutant Release and Transfer Register (PRTR) system. In addition to chromate and molybdate, acid salts such as nitrate, nitrite, tungstate, borate, silicate, and sulfite and amine salts are known to be effective as metal corrosion inhibitors (see PTL 2). PTL 3 discloses that, out of the acid salts above, nitrite and molybdate are used in combination to decrease the metal corrosiveness of acidic oxidants such as percarboxylic acid.

Some of the medical equipment and instruments contain an adhesive used at the joints of components, or are covered with an adhesive for protection purposes. It is essential to disinfect, for example, medical instruments such as endoscopes, among them, on a daily basis. However, it is necessary to take measures to ensure that the adhesive does not deteriorate, and that the functionality and appearance of the medical instrument are not damaged by the disinfection treatment. However, the medical and food fields need to consider residues and toxicity of the microbicidal component. Although acidic oxidants such as percarboxylic acid (e.g., peracetic acid) and hydrogen peroxide are microbicidal components with relatively fewer residuals and lower toxicity, such acidic oxidants are erosive to adhesives, especially synthetic adhesives. However, there is no known way to resolve this problem from a microbicidal composition perspective.

PTL 4 discloses a composition for cleaning and decontaminating a dialyzer, containing an oxidant formed of a peracid compound and a buffer. The composition contains a mixture of 0.0050 to 0.5%$^{W/V}$ of peracetic acid and 0.5 to 50.0%$^{W/V}$ of hydrogen peroxide as the oxidant, and a buffer with a pKa value of about 4.5 to 11.5 within the range of 2 mM to 2M as the buffer. PTL 4 specifically discloses that the buffer can be acetic acid, propanoic acid, glycine, monobasic dihydrogen phosphate, dibasic hydrogen phosphate, bicarbonate, or carbonate. However, the effects of such a composition for cleaning and decontamination on adhesives when applied to medical equipment have not been confirmed.

CITATION LIST

Patent Literature

PTL 1: US Patent Publication No. 5900256
PTL 2: JP2007-254693A
PTL 3: US Patent publication No. 5077008
PTL 4: WO01/019414A

SUMMARY OF INVENTION

Technical Problem

An object of the present invention is to provide a microbicidal composition usable in disinfection and/or microbicidal treatment of a test object containing an adhesive. More preferably, an object of the invention is, in particular, to provide a microbicidal composition capable of performing disinfection and/or microbicidal treatment of a test object containing a synthetic adhesive while limiting a decrease in durability of the adhesive.

Another object of the invention is to provide a combination of formulations (combination formulation) suitably usable in the preparation of the microbicidal composition.

Another object of the invention is to provide a method for disinfecting a test object by using the microbicidal composition, and disinfection equipment for use in the disinfection.

Solution to Problem

The present inventors conducted extensive research to achieve the objects and found that a combination of peracetic acid and hydrogen peroxide effective as microbicidal components with glycine, which is one of the aminocarboxylic acids, in a specific ratio can limit a decrease in durability of synthetic adhesives due to peracetic acid and hydrogen peroxide, while maintaining a desired disinfection effect. The inventors then confirmed that a microbicidal composition containing these three components is effectively usable as a disinfectant for a test object containing a synthetic adhesive such as instruments and equipment (e.g., endoscopes) in the medical or food field where disinfection and microbicidal treatment are required.

The present invention was completed as a result of further research based on these findings, and includes the following embodiments.

(I) Microbicidal Composition
(I-1) A microbicidal composition comprising
  peracetic acid,
  hydrogen peroxide, and
  glycine,
wherein the amount of the peracetic acid is 0.03 to less than 1.0 mass %, the amount of the hydrogen peroxide is 0.045 to less than 1.5 mass %, and the amount of the glycine is 0.036 mass % or more.
(I-2) The microbicidal composition according to (I-1), which is in the form of an aqueous solution with a pH of 2 or greater.

(I-3) The microbicidal composition according to (I-1) or (I-2), further comprising at least one auxiliary component selected from the group consisting of hydrogen phosphate, a chelating agent, and a pH buffer.

(I-4) The microbicidal composition according to any one of (I-1) to (I-3), which is a disinfectant and/or a microbicidal agent for a test object containing an adhesive, preferably a synthetic adhesive.

(I-5) The microbicidal composition according to (I-4), wherein the test object is an instrument or equipment for use in the medical or food field requiring disinfection or microbicidal treatment.

(I-6) The microbicidal composition according to any one of (I-1) to (I-5), not comprising at least nitrate, nitrite, tungstate, molybdate, chromate, borate, silicate, sulfite, and an amine salt as an anti-corrosive agent.

(II) Combination Formulation (II-1) A combination formulation comprising
  (A) a formulation containing peracetic acid and hydrogen peroxide, and
  (B) a formulation containing glycine,
wherein the formulation (A) and the formulation (B) are mixed with an aqueous solvent to prepare an aqueous solution before use, the aqueous solution containing 0.03 to less than 1.0 mass % of the peracetic acid, 0.045 to less than 1.5 mass % of the hydrogen peroxide, and 0.036 mass % or more of the glycine, the aqueous solution having a pH of 2 or greater.

(II-2) The combination formulation according to (II-1), wherein the formulation (B) further contains at least one auxiliary component selected from the group consisting of hydrogen phosphate, a chelating agent, and a pH buffer.

(II-3) The combination formulation according to (II-1) or (II-2), which is for use in the preparation of the microbicidal composition of any one of (I-1) to (I-6).

(III) A Method for Preparing a Microbicidal Composition (III-1) A method for preparing the microbicidal composition of (I-2), comprising mixing (A) a formulation containing peracetic acid and hydrogen peroxide and (B) a formulation containing glycine with an aqueous solvent to prepare an aqueous solution that contains 0.03 to less than 1.0 mass % of the peracetic acid, 0.045 to less than 1.5 mass % of the hydrogen peroxide, and 0.036 mass % or more of the glycine, and that has a pH of 2 or greater.

(III-2) The method according to (III-1), wherein the formulation (B) further contains at least one auxiliary component selected from the group consisting of hydrogen phosphate, a chelating agent, and a pH buffer.

(IV) Disinfection Equipment (IV-1) A disinfection equipment comprising
  a disinfection chamber, and
  a disinfectant delivery system,
wherein the disinfectant delivery system is configured to separately supply (A) a formulation containing peracetic acid and hydrogen peroxide and (B) a formulation containing glycine to the disinfection chamber in which the supplied formulation (A) and the supplied formulation (B) are mixed with separately supplied water to prepare an aqueous solution that contains 0.03 to less than 1.0 mass % of the peracetic acid, 0.045 to less than 1.5 mass % of the hydrogen peroxide, and 0.036 mass % or more of the glycine, and that has a pH of 2 or greater.

(IV-2) The disinfection equipment according to (IV-1), wherein the formulation (B) further contains at least one auxiliary component selected from the group consisting of hydrogen phosphate, a chelating agent, and a pH buffer.

(IV-3) The disinfection equipment according to (IV-1) or (IV-2), which is for use in disinfection or microbicidal treatment of a test object containing an adhesive, preferably a synthetic adhesive.

(IV-4) The disinfection equipment according to (IV-3), wherein the test object is an instrument or equipment for use in the medical or food field requiring disinfection or microbicidal treatment.

(V) Disinfection Method (V-1) A method for disinfecting a test object, comprising treating the test object with the microbicidal composition of any one of (I-1) to (I-6).

(V-2) The method according to (V-1), comprising, before the treating the test object, mixing (A) a formulation containing peracetic acid and hydrogen peroxide and (B) a formulation containing glycine with an aqueous solvent to prepare the microbicidal composition of any one of (I-1) to (I-6).

(V-3) The method according to (V-1) or (V-2), wherein the test object contains an adhesive, preferably a synthetic adhesive.

(V-4) The method according to (V-3), which is a method for disinfecting the test object while limiting a decrease in durability of the adhesive.

Advantageous Effects of Invention

The microbicidal composition disclosed by the present invention (simply "the microbicidal composition of the present invention" below) contains effective amounts of peracetic acid and hydrogen peroxide, which involve no residual or toxicity problems, as microbicidal components, and is thus usable as a chemical disinfectant and/or microbicidal agent in the medical or food field. In particular, due to its action of limiting a decrease in durability of synthetic adhesives, the microbicidal composition of the present invention is effectively usable as a disinfectant and/or microbicidal agent (practical liquid) targeting a test object containing a synthetic adhesive, such as a test object with portions jointed with a synthetic adhesive or a test object with a portion covered by a synthetic adhesive (e.g., medical instruments such as endoscopes, and instruments and equipment in the medical or food field where disinfection and microbicidal treatment are required). Examples of "a decrease in durability" includes a decrease in appearance (e.g., a change in color, blistering, and cracks) and/or a decrease in functionality (e.g., a decrease in adhesiveness and peeling).

The combination formulation disclosed by the present invention (simply "the combination formulation of the present invention" below) is a formulation housing (A) a formulation containing peracetic acid and hydrogen peroxide as a microbicidal component of the microbicidal composition of the present invention and (B) a formulation containing glycine to be mixed with formulation (A), with each component contained in a separate container at a relatively high concentration (two agents to be mixed and diluted in use). This allows for the storage of peracetic acid and hydrogen peroxide while maintaining the stability of peracetic acid and hydrogen peroxide, and allows for simple preparation of the microbicidal composition of the present invention by mixing both formulations and diluting the mixture with an aqueous solvent such as water in use.

The disinfection equipment disclosed by the present invention (simply "the disinfection equipment of the present invention" below) allows for simple preparation of the microbicidal composition of the present invention by using (A) the formulation containing peracetic acid and hydrogen peroxide and (B) the formulation containing glycine; and also allows for simple disinfection and microbicidal treatment of a test object containing a synthetic adhesive, such as instruments and equipment in the medical or food field.

The disinfection method disclosed by the present invention (simply "the disinfection method of the present invention" below) allows for effective disinfection and microbicidal treatment of a test object containing a synthetic adhesive, such as instruments and equipment in the medical or food field, by using the microbicidal composition of the present invention while limiting a decrease in durability of the adhesive.

DESCRIPTION OF EMBODIMENTS

Definition of Terms

The term "microbicidal treatment" means killing microorganisms. The type of target microorganisms and the degree of extinction are not particularly limited. Thus, the term is interpreted in a broad sense. The "microbicidal composition" refers to a composition with such microbicidal action, and may be any composition at least with action of killing some microorganisms regardless of the extent of the action. The "microbicidal agent" refers to a formulation used for a microbicidal purpose.

The term "disinfection" refers to neutralizing toxicity by decreasing the number of microorganisms to a harmless level or by rendering them non-infective, i.e., rendering pathogenic microorganisms present in a target test object harmless. The phrase "rendering pathogenic microorganisms harmless" includes rendering pathogenic bacteria harmless by completely killing the bacteria ("microbicidal treatment" in a narrow sense). In that sense, "disinfection" includes microbicidal treatment in a narrow sense that means killing almost all of pathogenic bacteria for detoxification. The term "disinfectant" refers to a formulation for a disinfection purpose. As stated above, the disinfectant includes a disinfectant with microbicidal action, which may be referred to as a "disinfectant and microbicidal agent."

As shown in Table 1, disinfection is classified into sterilization, high-level disinfection, intermediate-level disinfection, and low-level disinfection according to the Spaulding's disinfection level classification. A disinfection treatment and/or a disinfectant suitable for each level is selected according to the intended use of the test object to be disinfected (Rutala WA: APIC Guideline for selection and use of disinfectants, 1996. Am J Infect Control 1996; 24: 313-342).

TABLE 1

| Spaulding's Disinfection Level Classification | |
|---|---|
| Disinfection level | Definition |
| Sterilization | To completely eliminate or destroy all forms of microbial life. |
| High-level disinfection | To kill all microorganisms with the exception of a high number of bacterial spores. |
| Intermediate-level disinfection | To kill *Mycobacterium tuberculosis*, vegetative bacteria, most viruses, and most fungi, but not necessarily kill bacterial spores. |

TABLE 1-continued

| Spaulding's Disinfection Level Classification | |
|---|---|
| Disinfection level | Definition |
| Low-level disinfection | To kill most vegetative bacteria, some viruses and some fungi, but not highly resistant microorganisms such as *Mycobacterium tuberculosis* and bacterial spores. |

For example, for instruments and equipment used in the medical field, the infection control guidelines state as standard precautions that disinfection treatment by sterilization must be performed on critical instruments (critical items, such as surgical instruments, circulatory devices or urinary catheters, implants, needles and scalpels) inserted into sterile tissues or blood vessels. The infection control guidelines also state that a high-level disinfection treatment or intermediate-level disinfection treatment must be performed on semi-critical instruments (semi-critical items, such as respiratory therapy equipment, anesthesia equipment, endoscopes, laryngoscopes, nebulizers, endotracheal tubes, and thermometers) used in contact with mucosa or unhealthy skin such as damaged skin. The infection control guidelines also state that a low-level disinfection treatment must be performed on non-critical instruments (non-critical items, such as blood pressure cuffs, stethoscopes, crutches, bedpans, and environmental surfaces including toilet seats and bed rails) used in contact only with healthy skin.

(I) Microbicidal Composition

The microbicidal composition of the present invention contains peracetic acid, hydrogen peroxide, and glycine. The microbicidal composition according to the present invention has microbicidal action based on the microbicidal action of peracetic acid and hydrogen peroxide. The microbicidal composition of the present invention is effectively usable in microbicidal treatment, preferably disinfection and microbicidal treatment, of a test object.

The amount of peracetic acid in the microbicidal composition of the present invention can be set within the range of 0.03 to less than 1.0 mass %. As shown in the Examples, described later, the lower limit can be freely selected from the range of 0.03 to 0.07 mass %, and the upper limit can be freely selected from the range of 0.4 to less than 1.0 mass %. The amount of peracetic acid is preferably 0.03 to 0.9 mass %, more preferably 0.03 to 0.8 mass %, still more preferably 0.03 to 0.6 mass %, and particularly preferably 0.03 to 0.4 mass %.

The amount of hydrogen peroxide in the microbicidal composition of the present invention can be set within the range of 0.045 to less than 1.5 mass %. As shown in the Examples, described later, the lower limit can be freely selected from the range of 0.45 to 0.11 mass %, and the upper limit can be freely selected from the range of 0.6 to less than 1.5 mass %. The amount of hydrogen peroxide is preferably 0.045 to 1.35 mass %, more preferably 0.045 to 1.2 mass %, still more preferably 0.045 to 0.9 mass %, and particularly preferably 0.045 to 0.6 mass %.

The amount of glycine in the microbicidal composition of the present invention can be set within the range of 0.036 mass % or more. The upper limit is not limited as long as it does not adversely affect the effects of the microbicidal composition of the present invention. Taking into consideration, for example, cost, it is unnecessary to add an excessively large amount of glycine. For example, the amount of glycine can be adjusted as appropriate within the range of 0.036 to 2 mass %. As shown in the Examples, described later, the lower limit can be freely selected from the range of 0.036 to 0.08 mass %, and the upper limit can be freely selected from the range of 0.48 to less than 1.2 mass %, or 0.48 to 1.08 mass %. The amount of glycine is preferably 0.036 to less than 1.2 mass %, more preferably 0.036 to 1.08 mass %, still more preferably 0.036 to 0.96 mass %, yet more preferably 0.036 to 0.72 mass %, and particularly preferably 0.036 to 0.48 mass %.

The microbicidal composition of the present invention as a practical liquid capable of limiting the corrosive action of peracetic acid and hydrogen peroxide on synthetic adhesives while exhibiting desired microbicidal action can be prepared by adding peracetic acid, hydrogen peroxide, and glycine to an aqueous solvent so as to give the proportions described above, and dissolving them.

Although not limited, the proportion of hydrogen peroxide per 100 parts by mass of peracetic acid in the microbicidal composition according to the present invention can be 50 to 600 parts by mass, preferably 70 to 450 parts by mass, and more preferably 100 to 200 parts by mass. The proportion of glycine per 100 parts by mass of peracetic acid can be 15 to 500 parts by mass, preferably 50 to 350 parts by mass, and more preferably 80 to 180 parts by mass. Additionally, the proportion of glycine per 100 parts by mass of hydrogen peroxide can be 10 to 350 parts by mass, preferably 30 to 230 parts by mass, and more preferably 50 to 120 parts by mass.

The microbicidal composition of the present invention is a composition in the form of an aqueous solution prepared by dissolving the three components in an aqueous solvent. The aqueous solvent is, for example, preferably water. The type of water is not particularly limited, and can be tap water, distilled water, ion-exchanged water, or RO water. The microbicidal composition of the present invention has been confirmed to show microbicidal action even when prepared with water with a relatively high hardness (hard water), as shown in Experimental Example 1, described later. Specifically, the microbicidal composition of the present invention may be prepared by using water with a hardness on a calcium carbonate concentration basis of at least 400 ppm or less, and more preferably 60 to 400 ppm.

The microbicidal composition of the present invention may contain another aqueous solvent in combination with water as long as it does not adversely affect the dissolution of the three components and the effects of the present invention. Examples of such aqueous solvents include those compatible with water such as ethanol, propanol, isopropanol, butanol, acetone, and acetonitrile.

The microbicidal composition of the present invention may further contain at least one auxiliary component selected from the group consisting of hydrogen phosphate, a chelating agent, and a pH buffer as long as it does not adversely affect the dissolution of the three components and the effects of the present invention.

Hydrogen phosphate includes alkali metal salts of hydrogen phosphate such as dipotassium hydrogen phosphate, disodium hydrogen phosphate, potassium dihydrogen phosphate, and sodium dihydrogen phosphate. Preferably, hydrogen phosphate is dipotassium hydrogen phosphate, and disodium hydrogen phosphate, and more preferably dipotassium hydrogen phosphate. Although not limited thereto, the amount of hydrogen phosphate in the microbicidal composition of the present invention can be set within the range of 0 to 0.3 mass %, preferably 0 to 0.2 mass %, and more preferably 0 to 0.12 mass %. An example of the minimum amount of hydrogen phosphate added is, but not limited to, 0.009 mass %.

The chelating agent can be used for the purpose of chelating metals such as calcium, magnesium, divalent copper ions, divalent iron ions, trivalent iron ions, and manganese ions in tap water. Specifically, examples include, but are not limited to, ethylenediaminetetraacetate, diethylenetriaminepentaacetate, hydroxyethyl ethylenediamine triacetate, L-glutamic acid diacetate, hydroxyethane diphosphonate, nitrilotris methylene phosphonate, phosphonobutane tricarboxylate, and ethylenediamine tetramethylene phosphonate. The chelating agent is preferably tetrasodium hydroxyethane diphosphonate. The chelating agent can be used in such a proportion that can achieve the above purpose. Although not limited thereto, the amount of the chelating agent in the microbicidal composition of the present invention can be set within the range of 0 to 0.15 mass %, preferably 0 to 0.1 mass %, and more preferably 0 to 0.06 mass %. An example of the minimum amount of the chelating agent added is, but not limited to, 0.0045 mass %.

The pH buffer is used for adjusting the pH of the microbicidal composition of the present invention and for buffering the pH. Preferably, the pH buffer is used for adjusting or buffering the pH of the microbicidal composition of the present invention to 2 or greater, and more preferably 3 or greater. The upper limit of the pH of the microbicidal composition of the present invention is, but not limited to, preferably 7. The range of pH is, for example, 2 to 7, preferably 3 to 7, and more preferably 3 to 6. Specifically, examples of pH buffers include, but are not limited to, hydroxide salts such as potassium hydroxide and sodium hydroxide, organic acids or salts thereof such as citric acid and citrate, and phosphoric acid or salts thereof (e.g., trisodium phosphate and dipotassium phosphate).

The microbicidal composition of the present invention may further contain, for example, a stabilizer and a preservative as optional components. The stabilizer is used for the purpose of stabilizing microbicidal components such as peracetic acid and hydrogen peroxide, and the stabilizer specifically includes a water-soluble solvent, an amphipathic solvent, and a surfactant. The stabilizer is preferably a polyhydric alcohol such as propylene glycol, dipropylene glycol, or butylene glycol. The stabilizer can be used in such a proportion that can achieve the purpose. Although not limited thereto, the amount of the stabilizer in the microbicidal composition of the present invention can be set within the range of 0 to 1 mass %, preferably 0 to 0.7 mass %, and more preferably 0 to 0.4 mass %. An example of the minimum amount of the stabilizer is, but not limited to, 0.03 mass %.

The preservative can be, for example, benzoic acid or a salt thereof (e.g., an alkali metal salt such as sodium benzoate), a paraben (e.g., ethyl parahydroxybenzoate), an isothiazoline compound (e.g., methylisothiazolinone), phenoxy ethanol, and hexylene glycol. Although not limited thereto, the amount of the preservative in the microbicidal composition of the present invention can be set within the range of 0 to 0.1 mass %, preferably 0 to 0.07 mass %, and more preferably 0 to 0.04 mass %. An example of the minimum amount of the preservative is, but not limited to, 0.003 mass %.

The microbicidal composition of the present invention can be prepared by dissolving the peracetic acid, hydrogen peroxide, and glycine described above in the proportions described above in an aqueous solvent, and optionally adjusting the pH of the liquid to preferably 2 to 7, and more preferably 3 to 7 with a pH buffer. In this preparation process, the auxiliary components such as hydrogen phosphate or a chelating agent described above, or the optional components such as a stabilizer or a preservative described above may optionally be added in addition to the three components.

The microbicidal composition of the present invention preferably does not contain at least one member known as a corrosion inhibitor selected from the group consisting of chromate, molybdate, nitrate, nitrite, tungstate, borate, silicate, sulfite, and an amine salt; and preferably contains none of these.

The microbicidal composition of the present invention has microbicidal action against microorganisms such as general bacteria, acid-fast bacteria, fungi, viruses, and spores, due to the microbicidal action of peracetic acid and hydrogen peroxide. In particular, the microbicidal composition of the present invention has microbicidal action on general bacteria including Gram-negative bacteria and Gram-positive bacteria (*Staphylococcus aureus, Enterococcus faecium, Escherichia coli, Pseudomonas aeruginosa*), acid-fast bacteria (*Mycobacterium terrae*), fungi (*Candida albicans* or *Aspergillus brasiliensis*), viruses (Poliovirus, Adenovirus, Norovirus, Influenzavirus, Coronavirus), and spores such as *Bacillus subtilis* spores (*Bacillus subtilis*) and gas bacilli spores (*Clostridium sporogenes*). The microbicidal action on these microorganisms can be evaluated according to a common method in the art in a suspension test or carrier test.

Additionally, the microbicidal composition of the present invention has properties of limiting a decrease in durability of synthetic adhesives due to the action of peracetic acid and hydrogen peroxide.

Synthetic adhesives may change in color due to the deterioration of the adhesive component. The deterioration of the adhesive component may also form fine bubbles (a bubbling phenomenon) or cracks. Additionally, a gap may form between an adhered item and an adhesive, and the adhered item eventually comes off. If the durability of the adhesive deteriorates and the adhesive component deteriorates in this way, the adhesive power decreases or disappears, which may further cause the adhered item or adhesive to fall (come off), or impair the strength of an instrument or equipment, or cause the adhesive component to leach out (leak). Contamination with foreign matter or leaching out (leakage) of the adhesive component due to the fall of the adhered item or adhesive may have adverse effects on the human body, in particular in the case of medical instruments or equipment applied to the human body, tableware, and cooking utensils.

When used in a test object containing a synthetic adhesive, the microbicidal composition of the present invention enables effective microbicidal treatment and/or disinfection treatment while preventing a decrease in durability of the adhesive due to peracetic acid and hydrogen peroxide. Thus, the microbicidal composition of the present invention is particularly useful as a disinfectant and/or a microbicidal agent (including a disinfectant and microbicidal agent), for example, for a test object containing a synthetic adhesive. In particular, the microbicidal composition of the present invention is suitably usable in microbicidal treatment and/or disinfection of a test object that cannot be subjected to microbicidal treatment (e.g., high-temperature microbicidal treatment, and microbicidal treatment with a highly corrosive microbicidal agent) that may have adverse effects on synthetic adhesives.

Although not limited thereto, the test object containing a synthetic adhesive is, for example, a test object formed by joining parts with a synthetic adhesive (a test object having a portion jointed with a synthetic adhesive), a test object entirely or partly covered by a synthetic adhesive, or a test object formed by filling a recess. Preferable examples of test objects include, but are not limited to, medical equipment such as endoscopes, ventilators, anesthesia machine circuits, cystoscopes, laryngoscope blades, bite blocks, nebulizers, catheters, puncture devices for blood collection, ultrasound echo probes, dental probes, curettes, files, mirrors, impression trays, scalers, palate instruments, and reamers; and instruments for food such as baby bottles, baby bottle nipples, dishes, and cups. Examples of the material forming these test objects include, but are not limited to, glass, plastics, elastomer, ceramics, aluminum, aluminum alloy, stainless steel, tungsten alloy, nickel titanium alloy, nickel chromium alloy, titanium alloy, cobalt alloy, and cobalt chromium alloy.

The synthetic adhesives include thermoplastic resin adhesives (e.g., vinyl acetate resin adhesives, polyvinyl acetal adhesives, ethylene vinyl acetate resin adhesives, vinyl chloride resin adhesives, acrylic resin adhesives, polyamide adhesives, cellulose adhesives, and α-olefin adhesives), thermosetting resin adhesives (e.g., urea resin adhesives, melamine resin adhesives, phenol resin adhesives, resorcinol resin adhesives, epoxy resin adhesives, polyester adhesives, polyurethane adhesives, and polyaromatic adhesives), and elastomer adhesives (chloroprene rubber adhesives, nitrile rubber adhesives, styrene butadiene rubber adhesives, polysulfide adhesives, butyl rubber adhesives, silicone adhesives (including modified silicone adhesives), acrylic adhesives, urethane adhesives, silylated urethane resin adhesives, and telechelic polyacrylate adhesives). The microbicidal composition of the present invention has properties of limiting a decrease in durability of at least, although not limited to, vinyl acetate resin adhesives that fall under the category of thermoplastic resin adhesives, epoxy resin adhesives that fall under the category of thermosetting resin adhesives, and silicone adhesives that fall under the category of elastomer adhesives.

Whether the microbicidal composition of the present invention has properties of limiting a decrease in durability of synthetic adhesives can be evaluated simply, as explained in, for example, Experimental Example 2, described later, by immersing a test piece having a synthetic adhesive applied in the microbicidal composition of the present invention kept at 40° C. for 16 hours, then washing the test piece with distilled water, and visually observing the appearance of the naturally dried adhesive. The items to be evaluated in this evaluation are mainly whether color change, bubbles, cracks, and/or gap and peeling are present. If none of these are observed, the microbicidal composition in question is determined to have properties of limiting a decrease in durability of synthetic adhesives due to peracetic acid and hydrogen peroxide. In particular, as seen in the relationship between Example 2-1 and Comparative Example 2-1, the microbicidal composition of the present invention with improvement in at least one of the evaluation items, as compared with a composition formed by excluding only glycine from the microbicidal composition of the present invention (comparative composition), is evaluated as capable of limiting a decrease in durability of adhesives due to peracetic acid and hydrogen peroxide thanks to the addition of glycine.

(II) Combination Formulation

The microbicidal composition of the present invention described above is a practical liquid usable as is in microbicidal treatment and/or disinfection treatment of a test object. However, given the stability of peracetic acid and hydrogen peroxide in water, the microbicidal composition is preferably prepared before use by mixing the components and adjusting the mixture by dilution with an aqueous solvent so as to give the content of each component as described above.

Thus, the present invention provides a combination formulation including (A) a formulation containing peracetic acid and hydrogen peroxide and (B) a formulation containing glycine, with formulations (A) and (B) each filled in an individual separate container. As an embodiment of the combination formulation, an example is a combination formulation including the formulations (A) and (B) each enriched, filled in a separate container, and packaged as a two-formulation product or kit product, which is supplied to the market. The two-formulation product or kit product is in a form used such that a user mixes the two formulations (A) and (B) and dilutes the mixture with an aqueous solvent before use. The formulation (B) may optionally contain at least one auxiliary component selected from the group consisting of hydrogen phosphate, a chelating agent, and a pH buffer, in addition to glycine. The formulation (B) may also contain a stabilizer and/or a preservative as optional components.

The aqueous solvent, hydrogen phosphate, chelating agent, pH buffer, stabilizer, and preservative for use in this case can be those explained in section (I) above.

The formulation (A) and formulation (B) may be in the form of liquid, or in the form of solids such as powder, granules, or tablets.

The proportion of peracetic acid and hydrogen peroxide in the formulation (A) and the proportion of glycine, auxiliary components, and/or optional components in the formulation (B) are not particularly limited as long as the microbicidal composition of the present invention described in section (I) is prepared by mixing these components with an aqueous solvent. Specifically, it is sufficient if mixing the formulations (A) and (B) and diluting the mixture with an aqueous solvent results in peracetic acid in an amount of 0.03 to less than 1.0 mass %, hydrogen peroxide in an amount of 0.045 to less than 1.5 mass %, glycine in an amount of 0.036 mass % or more (preferably 0.036 to 2 mass %), hydrogen phosphate in an amount of 0 to 0.3 mass %, a chelating agent in an amount of 0 to 0.15 mass %, and a stabilizer in an amount of 0 to 1 mass %. Although not limited thereto, the proportions of the components in the formulations (A) and (B) are preferably those that result in, after mixing and dilution, peracetic acid in an amount of 0.03 to 0.9 mass %, hydrogen peroxide in an amount of 0.045 to 1.35 mass %, and glycine in an amount of 0.036 to 1.08 mass %; more preferably, after mixing and dilution, peracetic acid in an amount of 0.03 to 0.8 mass %, hydrogen peroxide in an amount of 0.045 to 1.2 mass %, and glycine in an amount of 0.036 to 0.96 mass %; still more preferably, after mixing and dilution, peracetic acid in an amount of 0.03 to 0.6 mass %, hydrogen peroxide in an amount of 0.045 to 0.9 mass %, and glycine in an amount of 0.036 to 0.72 mass %; and particularly preferably, after mixing and dilution, peracetic acid in an amount of 0.03 to 0.4 mass %, hydrogen peroxide in an amount of 0.045 to 0.6 mass %, and glycine in an amount of 0.036 to 0.48 mass %.

The formulation (A) and the formulation (B) are set to give a pH of 2 to 7, and preferably 3 to 7, when mixed and diluted with an aqueous solvent. The proportion of the pH buffer optionally added to the formulation (B) can also be set appropriately up to the limit at which the pH can be adjusted so as to fall within these ranges.

The dilution factor by the aqueous solvent is not particularly limited, but can be about 20- to 300-fold. Examples of the combination formulation as described above include, but are not limited to, a combination formulation including the formulation (A) containing peracetic acid in an amount of 5 to 45 mass % and hydrogen peroxide in an amount of 5 to 35 mass %, and the formulation (B) containing glycine in an amount of 3 to 54 mass %.

The combination formulation of the present invention can be suitably used in the preparation of the microbicidal composition of the present invention described above. Specifically, the microbicidal composition of the present invention can be easily prepared by mixing the formulation (A) and the formulation (B) included in the combination formulation of the present invention, and diluting the mixture with an aqueous solvent.

(III) Disinfection Equipment

The microbicidal composition of the present invention prepared from the formulation (A) and the formulation (B) can be suitably used in microbicidal treatment and/or disinfection treatment of a test object containing a synthetic adhesive (which is collectively referred to as "disinfection and microbicidal treatment" below). Without any limitation, this treatment can be performed with any disinfection equipment.

The disinfection equipment can be, for example, equipment provided with at least a disinfection chamber and a disinfectant delivery system. The disinfection chamber is an openable compartment (room) used in disinfection and microbicidal treatment of a test object. As described below, this compartment can be used in the preparation of the microbicidal composition of the present invention, disinfection and microbicidal treatment of the test object with the microbicidal composition, and/or washing treatment after disinfection and microbicidal treatment. The disinfectant delivery system includes a line to deliver the formulation (A) to the disinfection chamber, and a line to deliver the formulation (B) to the disinfection chamber, and supplies the formulation (A) and the formulation (B) separately to the disinfection chamber. The disinfectant delivery system also includes a water injection line to deliver an aqueous solvent to the disinfection chamber, separately from the lines mentioned above. The disinfectant delivery system supplies the formulation (A), the formulation (B), and an aqueous solvent into the disinfection chamber through individual lines, and the components are mixed to prepare an aqueous solution (the microbicidal composition of the present invention) containing 0.03 to less than 1.0 mass % of peracetic acid, 0.045 to less than 1.5 mass % of hydrogen peroxide, and 0.036 mass % or more, preferably 0.036 to 2 mass % of glycine, with a pH of 2 or greater.

The disinfection and microbicidal treatment with the disinfection equipment can be performed by exposing (e.g., immersing, spraying, or coating) a target test object to an aqueous solution (the microbicidal composition of the present invention) in the disinfection chamber. The temperature of the microbicidal composition of the present invention used in the disinfection and microbicidal treatment is preferably, but not limited to, 10° C. or higher, preferably 15° C. or higher, and more preferably 20° C. or higher. While the limit is 100° C., the upper limit of the temperature can be any temperature, for example, 60° C. or lower, and preferably 40° C. or lower. The exposure time is also not limited as long as the microbicidal effect can be achieved. The exposure time can be selected, for example, from the range of 1 minute to 24 hours, preferably 5 minutes to 16 hours.

After the disinfection and microbicidal treatment with the microbicidal composition of the present invention, the test object can optionally be washed with water and dried, and then the disinfection and microbicidal treatment can be completed.

(IV) Disinfection Method

The disinfection method of the present invention can be performed by treating a test object with the microbicidal composition of the present invention described above.

The target test object for treatment is not limited, but is preferably a test object containing an adhesive. The adhesive includes the synthetic adhesives described above. Although not limited thereto, the test object containing an adhesive includes, for example, a test object formed by joining parts with an adhesive, and a test object partially covered by an adhesive. Preferably, the test object containing an adhesive is a test object having a portion jointed with an adhesive.

Examples of the target test object for treatment include, but are not limited to, instruments and equipment for use in the medical or food field requiring disinfection or microbicidal treatment. Examples of instruments and equipment for use in the medical field include, but are not limited to, endoscopes, respiratory therapy equipment, anesthesia equipment, cystoscopes, laryngoscope blades, bite blocks, nebulizers, catheters (e.g., trachea catheters, and transnasal catheters), puncture devices for blood collection, ultrasound echo probes, dental mirrors, impression trays, scalers, palate instruments, and reamers. These include those classified into the critical instruments or the semi-critical instruments described above. Examples of instruments and equipment for use in the food field include instruments for food (including tableware) such as baby bottles, baby bottle nipples, dishes, and cups, cooking utensils, cooking appliances, and cooking tables.

The disinfection treatment can be, for example, a method of allowing a test object to stay in contact with the microbicidal composition of the present invention. Specific examples include a method of immersing a test object in the microbicidal composition of the present invention, a method of spraying or coating a test object with the microbicidal composition of the present invention, a method of passing the microbicidal composition of the present invention through a test object, and a method of wiping a test object with a cloth sheet moistened with the microbicidal composition of the present invention. After disinfection treatment with the microbicidal composition of the present invention, the disinfected test object may optionally be washed with water and dried.

In the disinfection treatment, the microbicidal composition of the present invention for use may be, without a limitation, the composition prepared by mixing the formulations (A) and (B) with an aqueous solvent before use as described in section (II) above. In other words, an embodiment of the disinfection method of the present invention includes, in addition to the step of treating a test object with the microbicidal composition of the present invention, the step of preparing the microbicidal composition of the present invention by mixing the formulations (A) and (B) with an aqueous solvent as a preliminary step.

Because the microbicidal composition of the present invention can limit a decrease in durability of synthetic adhesives due to the action of peracetic acid and hydrogen peroxide, the microbicidal composition of the present invention is suitably usable, for example, in disinfection treatment of a test object containing a synthetic adhesive as stated above.

In the present specification, the terms "comprise" "contain" and "include" include the meanings of consisting of and consisting essentially of.

EXAMPLES

The following describes the present invention with reference to experimental examples to facilitate understanding of the elements and effects of the invention. However, the invention is not limited in any way by these experimental examples. The following experiments were conducted at room temperature (25±5° C.) under atmospheric pressure, unless otherwise noted. Unless otherwise specified, the unit "%" below indicates mass %, and the unit "parts" indicate parts by mass.

Experimental Example 1: Evaluation of Microbicidal Effect

The microbicidal effect of the microbicidal composition according to the present invention was evaluated by using *Aspergillus brasiliensis* (ATCC 16404) as a microorganism. *A. brasiliensis* is an environmental airborne microbe that may pose a risk of contamination in the medical field and forms highly drug-resistant spores in filamentous fungi.

(1) Preparation of Test Composition

The components shown in Table 2 were dissolved in synthetic hard water to give the individual concentration and pH specified in Table 2, thereby preparing test compositions (Examples 1-1 to 1-4 and Comparative Examples 1-1 to 1-7). The synthetic hard water for use was prepared by mixing 6 mL of the following solution A and 8 mL of the following solution B, and adjusting the mixture with distilled water to give a total amount of 1000 mL (the same applies to the Experimental Examples described below).

Solution A: $MgCl_2$ (1.984 g)+$CaCl_2$ (4.624 g) were dissolved in distilled water and adjusted to give a volume of 100 mL.

Solution B: $MgHCO_3$ (3.502 g) was dissolved in distilled water and adjusted to give a volume of 100 mL.

(2) Preparation of Inoculum Solution

A glycerol stock of *A. brasiliensis* was inoculated in a malt extract agar medium (Malt Extract Agar: Oxoid Limited) and cultured at 30° C. for 7 days. After culture, 0.05 mass % aqueous polysorbate 80 solution was added, and spores were scraped off with a cell spreader. The obtained spore liquid was placed in a 50-mL centrifuge tube, and 5 g of sterile glass beads was added, followed by stirring for 1 minute. After stirring, the liquid was filtered through a cell strainer (mesh size: 40 μm) twice for use.

(3) Evaluation Test for Microbicidal Effect

The microbicidal effect of the test compositions (Examples 1-1 to 1-4 and Comparative Examples 1-1 to 1-7) was evaluated in accordance with a test method (suspension test) prescribed in EN 13624:2013 (clean conditions). A test composition determined to have a microbicidal effect in this test method is usable in disinfection of a semi-critical instrument or equipment in the medical field as a high-level disinfectant according to the Spaulding's classification. Specifically, a test composition determined to have a microbicidal effect in this test method is determined to have a killing action on yeast-like fungi (including *Candida*) and filamentous fungi.

Specifically, the following operations were performed to evaluate the microbicidal effect.

(i) 0.5 mL of an inoculum solution kept at 35° C. beforehand, and 0.5 mL of an aqueous solution of an interfering substance under clean conditions (0.3% BSA (bovine serum albumin), the same below) are placed in a test tube, stirred, and allowed to stand at 35° C. for 2 minutes.

(ii) 4 mL of a test composition (test sample) kept at 35° C. beforehand is placed in the test tube of item (i), mixed, and allowed to act at 35° C.

(iii) After the duration of action indicated in Table 2, 0.5 mL of the mixture solution is taken and placed in 4.5 mL of a neutralizer (0.1% sodium thiosulfate, catalase), and inactivated.

(iv) 0.5 mL of the inactivated mixture solution is applied to the surface of a solid malt extract agar medium and cultured at 30° C.

(v) After three days from the culture, the viable fungi count is measured.

(vi) In accordance with the requirements of EN 13624: 2013, a log reduction value of fungi counts before and after the test being 4 $Log_{10}$ or higher is determined to be "A: having an effective microbicidal effect," and otherwise determined to be "B: having no effective microbicidal effect."

(4) Evaluation Results of Microbicidal Effect

Table 2 also shows the results.

of 0.03%, and a hydrogen peroxide concentration of 0.045%, containing 0.036 mass % or more of glycine, exhibited a desired microbicidal effect (Example 1-1). An aqueous solution with a hydrogen peroxide concentration of 0.045% or more and a glycine concentration of 0.036 mass % or more did not exhibit a desired microbicidal effect when the peracetic acid concentration was less than 0.03% (Comparative Example 1-2), and an aqueous solution with a peracetic acid concentration of 0.03% or more and a glycine concentration of 0.036 mass % or more did not exhibit a desired microbicidal effect when the hydrogen peroxide concentration was less than 0.045% (Comparative Example 1-3).

These results indicate that a microbicidal composition containing a relatively low concentration of peracetic acid and hydrogen peroxide can exhibit an enhanced microbicidal effect by containing glycine, and that the lowest concentration of each component to exhibit the desired microbicidal effect is the following: 0.03% for peracetic acid, 0.045% for hydrogen peroxide, and 0.036% for glycine. These results also indicate that the microbicidal effect of a microbicidal composition containing predetermined concentrations of peracetic acid, hydrogen peroxide, and glycine can be enhanced by adding an auxiliary component

TABLE 2

| | Concentration (mass %) in Test Composition (Aqueous Solution) | | | | | | | | | | |
|---|---|---|---|---|---|---|---|---|---|---|---|
| | Example | | | | Comparative Example | | | | | | |
| Component | 1-1 | 1-2 | 1-3 | 1-4 | 1-1 | 1-2 | 1-3 | 1-4 | 1-5 | 1-6 | 1-7 |
| Peracetic Acid | 0.03 | 0.03 | 0.04 | 0.07 | 0.03 | 0.015 | 0.03 | 0.01 | 0.02 | 0.07 | 0.07 |
| Hydrogen Peroxide | 0.045 | 0.045 | 0.06 | 0.105 | 0.045 | 0.045 | 0.02 | 0.015 | 0.03 | 0.105 | 0.105 |
| Glycine | 0.036 | 0.036 | 0.048 | 0.084 | 0 | 0.036 | 0.036 | 0.012 | 0.024 | 0 | 0 |
| Hydrogen Phosphate*[1] | 0 | 0.009 | 0.012 | 0.021 | 0 | 0 | 0 | 0.003 | 0.006 | 0 | 0.021 |
| Chelating Agent*[2] | 0 | 0.0045 | 0.006 | 0.0105 | 0 | 0 | 0 | 0.0015 | 0.003 | 0 | 0.0105 |
| Stabilizer*[3] | 0 | 0.03 | 0.04 | 0 | 0 | 0 | 0 | 0.01 | 0.02 | 0 | 0 |
| pH Adjuster*[4] | Moderate Amount | Moderate Amount | Moderate Amount | Moderate Amount | Moderate Amount | Moderate Amount | Moderate Amount | Moderate Amount | Moderate Amount | Moderate Amount | Moderate Amount |
| Total with Synthetic Hard Water | 100 | 100 | 100 | 100 | 100 | 100 | 100 | 100 | 100 | 100 | 100 |
| pH | 6 | 6 | 6 | 6 | 6 | 6 | 6 | 7 | 7 | 6 | 6 |
| Microbicidal Effect Action Time: 5 Minutes | — | — | — | A | — | — | — | — | — | B | B |
| Action Time: 20 Minutes | B | A | A | — | B | B | B | — | B | — | — |
| Action Time: 30 Minutes | A | — | — | — | B | B | B | B | B | — | — |

*[1]Dipotassium Hydrogen Phosphate
*[2]Tetrasodium Hydroxyethane Diphosphonate
*[3]Dipropylene Glycol
*[4]Potassium Hydroxide or Citric Acid
In the table, "—" indicates that no evaluation was made.

As shown in Table 2, even an aqueous solution containing peracetic acid and hydrogen peroxide (microbicidal components) did not exhibit a desired microbicidal effect when the peracetic acid concentration was 0.03% or less, and the hydrogen peroxide concentration was 0.045% or less, with no glycine contained (Comparative Example 1-1). In contrast, an aqueous solution with a peracetic acid concentration such as hydrogen phosphate, a chelating agent, and a stabilizer (Examples 1-2 and 1-3, and Comparative Examples 1-4 and 1-5). These results also indicate that the microbicidal effect of the microbicidal composition can be enhanced by increasing the amount of peracetic acid, hydrogen peroxide, or glycine (Example 1-4). However, an aqueous solution containing no glycine did not exhibit a desired microbicidal effect even when the amount of peracetic acid and hydrogen peroxide was increased, or when other auxiliary components were added (Comparative Examples 1-6 and 1-7).

To confirm that the achieved effect is unique to the use of glycine, the same test was performed using, instead of glycine, an equal molar amount of a buffer (acetic acid, trisodium phosphate, or dipotassium hydrogen phosphate) with a pKa ranging from 4.5 to 11.5 disclosed in cited Reference 4 in the formula of Example 1-1. Table 3 shows the results together with the results of Example 1-1 and Comparative Example 1-1.

TABLE 3

| Component | | Comparative Example 1-1 | Example 1-1 | Experimental Results | | |
|---|---|---|---|---|---|---|
| | | | | 1 | 2 | 3 |
| Peracetic Acid | | 0.03 | 0.03 | 0.03 | 0.03 | 0.03 |
| Hydrogen Peroxide | | 0.045 | 0.045 | 0.045 | 0.045 | 0.045 |
| Glycine | | 0.0 | 0.036 | 0 | 0 | 0 |
| Acetic Acid | | 0.0 | 0.0 | 0.03 | 0.0 | 0.0 |
| Trisodium Phosphate | | 0.0 | 0.0 | 0.0 | 0.08 | 0.0 |
| Dipotassium Hydrogen Phosphate | | 0.0 | 0.0 | 0.0 | 0.0 | 0.08 |
| pH Adjuster*[1] | | Moderate Amount | Moderate Amount | Moderate Amount | Moderate Amount | Moderate Amount |
| pH of Sterilizing Composition | | 6 | 6 | 6 | 6 | 6 |
| Microbicidal Effect | Action Time: 5 Minutes | — | — | — | — | — |
| | Action Time: 20 Minutes | B | B | B | B | B |
| | Action Time: 30 Minutes | B | A | B | B | B |

*[1]Potassium Hydroxide or Citric Acid
Note:
"—" indicates that no evaluation was made.
Note:
A log reduction value of 4 Log or higher is "A," a log reduction value of less than 4 Log is "B."

As is clear from the results, unlike glycine, acetic acid, trisodium phosphate, and dipotassium hydrogen phosphate could not enhance the microbicidal activity of the acidic oxidant of peracetic acid and hydrogen peroxide.

Experimental Example 2: Evaluation of Effect of Limiting Decrease in Durability of Synthetic Adhesive The effect of limiting a decrease in durability of adhesives by a microbicidal composition (corrosion inhibitory effect) was evaluated by using a silicone adhesive, an epoxy resin adhesive, and a vinyl acetate resin adhesive as synthetic adhesives.

(1) Preparation of Microbicidal Composition

The components listed in Tables 4 to 9 were dissolved in distilled water to give the concentration and pH indicated in these tables, thereby preparing microbicidal compositions.

(2) Preparation of Adhesive Test Piece

Vinyl tape (3 cm×5 cm) with two punched holes (14 mm in diameter, 2×1 row) was adhered to one surface of a test piece (3 cm×5 cm, thickness: 1.0 mm) made from SUS304 (austenite stainless steel), and an adhesive was poured into the holes. The surface was evenly spread with a spatula to match the height of the adhesive with the height of the vinyl tape, and the test piece was allowed to stand at room temperature for 24 hours or longer. After drying, the vinyl tape was peeled off, thereby preparing an adhesive test piece with the adhesive adhered on two spots on one surface.

For the adhesive, three types of adhesives (a silicone adhesive (adhesive A), an epoxy resin adhesive (adhesive B), and a vinyl acetate resin adhesive (adhesive C)) were used, and adhesive test pieces A, B, and C were prepared.

Adhesive

A: silicone adhesive (Super X No. 8008 black: Cemedine Co., Ltd.) (main component: acrylic-modified silicone resin)

B: epoxy resin adhesive (3M Panel Bond Mini 38315N: 3M) (main component: epoxy resin, curing agent: amine-based resin)

C: vinyl acetate resin adhesive (concrement CA-131: Cemedine Co., Ltd.) (component: vinyl acetate resin 25%, inorganic substance 50%, organic solvent 25%)

(3) Evaluation Test for Effect of Limiting Decrease in Durability (i) Test pieces A, B, and C are immersed in individual microbicidal compositions kept at 40° C. and allowed to stand for 16 hours.

(ii) After 16 hours, each test piece is taken out from the immersion solution, rinsed with distilled water, and allowed to stand at room temperature to naturally dry.

(iii) After drying, the appearance of the adhesive on each test piece is visually observed.

(iv) The effect of limiting a decrease in durability is evaluated based on the properties of adhesives on four items: "whether the color has changed: Yes (B)/No (A)," "whether bubbling (bubbles) has occurred: Yes (B)/No (A)," "whether a gap and peeling are present: Yes (B)/No (A), and "whether cracks are present: Yes (B)/No (A)."

(4) Evaluation Results of Effect of Limiting Decrease in Durability

Table 4 shows the results in regards to the effect of glycine and the impact of hydrogen peroxide in microbicidal compositions.

TABLE 4

Concentration (mass %) in Microbicidal Composition (Aqueous Solution)

| Component | Example | | | | Comparative Example | | |
|---|---|---|---|---|---|---|---|
| | 2-1 | 2-2 | 2-3 | 2-4 | 2-1 | 2-2 | 2-3 |
| Peracetic Acid | 0.4 | 0.4 | 0.3 | 0.5 | 0.4 | 0.4 | 0.4 |
| Hydrogen Peroxide | 0.6 | 0.6 | 0.45 | 0.75 | 0.6 | 5 | 5 |
| Glycine | 0.48 | 0.48 | 0.36 | 0.6 | 0.0 | 0.48 | 0.48 |
| Hydrogen Phosphate*[1] | 0.0 | 0.12 | 0.09 | 0.15 | 0.0 | 0.0 | 0.12 |
| Chelating Agent*[2] | 0.0 | 0.06 | 0.045 | 0.075 | 0.0 | 0.0 | 0.06 |

TABLE 4-continued

Concentration (mass %) in Microbicidal Composition (Aqueous Solution)

| Component | | | Example 2-1 | Example 2-2 | Example 2-3 | Example 2-4 | Comparative Example 2-1 | Comparative Example 2-2 | Comparative Example 2-3 |
|---|---|---|---|---|---|---|---|---|---|
| Stabilizer*3 | | | 0.0 | 0.4 | 0.3 | 0.5 | 0.0 | 0.0 | 0.4 |
| pH Adjuster*4 | | | Moderate Amount | Moderate Amount | Moderate Amount | Moderate Amount | Moderate Amount | Moderate Amount | Moderate Amount |
| Total with Distilled Water | | | 100 | 100 | 100 | 100 | 100 | 100.0 | 100 |
| pH of Microbicidal Composition | | | 6 | 6 | 6 | 6 | 6 | 6 | 6 |
| Silicone Adhesive | Evaluation Item | Change in Color | A | A | A | A | A | A | A |
| | | Bubbling | A | A | A | A | B | B | B |
| | | Cracking | A | A | A | A | A | A | A |
| | | Gap/Peeling | A | A | A | A | A | B | A |
| Epoxy Resin Adhesive | | Change in Color | A | A | A | A | A | A | A |
| | | Bubbling | A | A | A | A | A | A | A |
| | | Cracking | A | A | A | A | A | A | A |
| | | Gap/Peeling | A | A | A | A | A | B | B |
| Vinyl Acetate Resin Adhesive | | Change in Color | A | A | A | A | A | A | A |
| | | Bubbling | A | A | A | A | B | B | B |
| | | Cracking | A | A | A | A | A | A | A |
| | | Gap/Peeling | A | A | A | A | A | A | A |
| Determination | | | A | A | A | A | B | B | B |

*1Dipotassium Hydrogen Phosphate
*2Tetrasodium Hydroxyethane Diphosphonate
*3Dipropylene Glycol
*4Potassium Hydroxide or Citric Acid As shown in Table 4, the results indicate that the addition of glycine limits a decrease in durability (in particular, bubbling) of, in particular, the silicone adhesive or vinyl acetate resin adhesive due to peracetic acid and hydrogen peroxide (Examples 2-1 and 2-2 and Comparative Example 2-1). However, the silicone adhesive, epoxy resin adhesive, and vinyl acetate resin adhesive all had bubbling or a gap and peeling despite the glycine contained and were confirmed to have decreased (changed) durability, when the concentration of hydrogen peroxide was as high as 5% or more (Comparative Examples 2-2 and 2-3).

Table 5 shows the results in regards to the impact of the concentration of peracetic acid, hydrogen peroxide, and glycine in microbicidal compositions.

TABLE 5

Concentration (mass %) in Microbicidal Composition (Aqueous Solution)

| Component | | | Example 3-1 | Example 3-2 | Example 3-3 | Example 3-4 | Example 3-5 | Comparative Example 3-1 |
|---|---|---|---|---|---|---|---|---|
| Peracetic Acid | | | 0.5 | 0.6 | 0.7 | 0.8 | 0.9 | 1 |
| Hydrogen Peroxide | | | 0.75 | 0.9 | 1.05 | 1.2 | 1.35 | 1.5 |
| Glycine | | | 0.6 | 0.72 | 0.84 | 0.96 | 1.08 | 1.2 |
| pH Adjuster*1 | | | Moderate Amount | Moderate Amount | Moderate Amount | Moderate Amount | Moderate Amount | Moderate Amount |
| Total with Distilled Water | | | 100 | 100 | 100 | 100 | 100 | 100 |
| pH of Microbicidal Composition | | | 6 | 6 | 6 | 6 | 6 | 6 |
| Silicone Adhesive | Evaluation Item | Change in Color | A | A | A | A | A | A |
| | | Bubbling | A | A | A | A | A | A |
| | | Cracking | A | A | A | A | A | A |
| | | Gap/Peeling | A | A | A | A | A | B |
| Epoxy Resin Adhesive | | Change in Color | A | A | A | A | A | A |
| | | Bubbling | A | A | A | A | A | A |
| | | Cracking | A | A | A | A | A | A |
| | | Gap/Peeling | A | A | A | A | A | A |
| Vinyl Acetate Resin Adhesive | | Change in Color | A | A | A | A | A | B |
| | | Bubbling | A | A | A | A | A | B |
| | | Cracking | A | A | A | A | A | A |
| | | Gap/Peeling | A | A | A | A | A | A |
| Determination | | | A | A | A | A | A | B |

*1Potassium Hydroxide or Citric Acid

The results indicate that the microbicidal composition with a peracetic acid concentration of 1.0%, a hydrogen peroxide concentration of 1.5%, and a glycine concentration of 1.2% (Comparative Example 3-1) slightly decreased the durability of the silicone adhesive and vinyl acetate resin adhesive, but did not decrease the durability of the epoxy resin adhesive. This suggests that the peracetic acid concentration and the hydrogen peroxide concentration at which the action of limiting a decrease in durability of these adhesives can be brought about are respectively less than 1.0% and less than 1.5%. As noted above, an aqueous solution with a peracetic acid concentration of 1.0% or more and a hydrogen peroxide concentration of 1.5% or more did not sufficiently limit a decrease in durability of adhesives even when glycine was added in an amount of 1.2%. However, for example, an aqueous solution with a peracetic acid concentration of 1.35% and a hydrogen peroxide concentration of 1.08% as in Example 3-5 can provide the same effect as that in Example 3-5, even when containing more than 1.2% of glycine. This suggests that for an aqueous solution with a peracetic acid concentration of less than 1.0% and a hydrogen peroxide concentration of less than 1.5%, there is no upper limit of the amount of glycine from the standpoint of the effect of limiting a decrease in durability of adhesives.

Table 6 (silicone adhesive), Table 7 (epoxy resin adhesive), and Table 8 (vinyl acetate resin adhesive) show the results in regards to the impact of the pH of microbicidal compositions.

TABLE 6

Concentration (mass %) in Microbicidal Composition (Aqueous Solution)

| | | Component | Example 4-1 | 4-2 | 4-3 | 4-4 | 4-5 |
|---|---|---|---|---|---|---|---|
| | | Peracetic Acid | 0.2 | 0.2 | 0.2 | 0.2 | 0.2 |
| | | Hydrogen Peroxide | 0.3 | 0.3 | 0.3 | 0.3 | 0.3 |
| | | Glycine | 0.24 | 0.24 | 0.24 | 0.24 | 0.24 |
| | | pH Adjuster[1] | Moderate Amount | Moderate Amount | Moderate Amount | Moderate Amount | Moderate Amount |
| | | Total with Distilled Water | 100 | 100 | 100 | 100 | 100 |
| | | pH of Microbicidal Composition | 3 | 4 | 5 | 6 | 7 |
| Silicone Adhesive | Evaluation Item | Change in Color | A | A | A | A | A |
| | | Bubbling | A | A | A | A | A |
| | | Cracking | A | A | A | A | A |
| | | Gap/Peeling | A | A | A | A | A |
| | | Determination | A | A | A | A | A |

[1]Potassium Hydroxide or Citric Acid

TABLE 7

Concentration (mass %) in Microbicidal Composition (Aqueous Solution)

| | | Component | Example 5-1 | 5-2 | 5-3 | 5-4 | 5-5 | 5-6 |
|---|---|---|---|---|---|---|---|---|
| | | Peracetic Acid | 0.6 | 0.6 | 0.6 | 0.6 | 0.6 | 0.6 |
| | | Hydrogen Peroxide | 0.9 | 0.9 | 0.9 | 0.9 | 0.9 | 0.9 |
| | | Glycine | 0.72 | 0.72 | 0.72 | 0.72 | 0.72 | 0.72 |
| | | pH Adjuster[1] | Moderate Amount | Moderate Amount | Moderate Amount | Moderate Amount | Moderate Amount | Moderate Amount |
| | | Total with Distilled Water | 100 | 100 | 100 | 100 | 100 | 100 |
| | | pH of Microbicidal Composition | 2 | 3 | 4 | 5 | 6 | 7 |
| Epoxy Resin Adhesive | Evaluation Item | Change in Color | A | A | A | A | A | A |
| | | Bubbling | A | A | A | A | A | A |
| | | Cracking | A | A | A | A | A | A |
| | | Gap/Peeling | A | A | A | A | A | A |
| | | Determination | A | A | A | A | A | A |

[1]Potassium Hydroxide or Citric Acid

TABLE 8

Concentration (mass %) in Microbicidal Composition (Aqueous Solution)

| Component | Example 6-1 | 6-2 | 6-3 | 6-4 | 6-5 |
|---|---|---|---|---|---|
| Peracetic Acid | 0.2 | 0.2 | 0.2 | 0.2 | 0.2 |
| Hydrogen Peroxide | 0.3 | 0.3 | 0.3 | 0.3 | 0.3 |
| Glycine | 0.24 | 0.24 | 0.24 | 0.24 | 0.24 |

TABLE 8-continued

| pH Adjuster*[1] | Moderate Amount | Moderate Amount | Moderate Amount | Moderate Amount | Moderate Amount |
|---|---|---|---|---|---|
| Total with Distilled Water | 100 | 100 | 100 | 100 | 100 |
| pH of Microbicidal Composition | 3 | 4 | 5 | 6 | 7 |
| Vinyl Acetate Resin Adhesive — Evaluation Item — Change in Color | A | A | A | A | A |
| Bubbling | A | A | A | A | A |
| Cracking | A | A | A | A | A |
| Gap/Peeling | A | A | A | A | A |
| Determination | A | A | A | A | A |

*[1]Potassium Hydroxide or Citric Acid

The results indicate that the microbicidal compositions at a pH of 2 to 7, preferably 3 to 7, have properties of limiting a decrease in durability of these adhesives.

To confirm that the achieved effect is unique to the use of glycine, the same test was performed using, instead of glycine, an equal molar amount of a buffer (acetic acid, trisodium phosphate, dipotassium hydrogen phosphate) disclosed in cited Reference 4 in the formula of Example 3-5. The same test was also performed without using a buffer and glycine as a control. Table 9 shows the results together with the results of Example 3-5.

TABLE 9

| Component | | | Control | Example 3-5 | Experimental Results 1 | 2 | 3 |
|---|---|---|---|---|---|---|---|
| Peracetic Acid | | | 0.9 | 0.9 | 0.9 | 0.9 | 0.9 |
| Hydrogen Peroxide | | | 1.35 | 1.35 | 1.35 | 1.35 | 1.35 |
| Glycine | | | 0.0 | 1.08 | 0 | 0 | 0 |
| Acetic Acid | | | 0.00 | 0.00 | 0.86 | 0.00 | 0.00 |
| Trisodium Phosphate | | | 0.00 | 0.00 | 0.00 | 2.36 | 0.00 |
| Dipotassium Hydrogen Phosphate | | | 0.00 | 0.00 | 0.00 | 0.00 | 2.51 |
| pH Adjuster*[1] | | | Moderate Amount | Moderate Amount | Moderate Amount | Moderate Amount | Moderate Amount |
| pH of Microbicidal Composition | | | 6 | 6 | 6 | 6 | 6 |
| Silicone Adhesive | Evaluation Item | Change in Color (Whitening) | A | A | A | B | B |
| | | Bubbling | A | A | A | A | A |
| | | Cracking | A | A | A | A | A |
| | | Gap/Peeling | B | A | B | A | B |
| Epoxy Resin Adhesive | | Change in Color (Whitening) | A | A | A | A | A |
| | | Bubbling | A | A | A | A | A |
| | | Cracking | A | A | A | A | A |
| | | Gap/Peeling | A | A | A | A | A |
| Vinyl Acetate Resin Adhesive | | Change in Color | A | A | A | A | A |
| | | Bubbling | B | A | B | B | B |
| | | Cracking | A | A | A | A | B |
| | | Gap/Peeling | A | A | A | A | A |
| | | Determination | B | A | B | B | B |

*[1]Potassium Hydroxide or Citric Acid
Note:
Evaluation was made based on change in color, bubbling, cracking, and gap or peeling (A or B).

As shown in the results, acetic acid, trisodium phosphate, and dipotassium hydrogen phosphate, unlike glycine, had no action of limiting a decrease in durability of synthetic adhesives due to the oxidants. This indicates that the effect of limiting a decrease in durability of adhesives due to the oxidants (peracetic acid and hydrogen peroxide) is unique to the use of glycine in combination.

Experimental Example 3: Evaluation of Microbicidal Effect on Various Microorganisms (No. 1)

The microbicidal effect of the microbicidal composition according to the present invention was evaluated according to an in vitro test based on the European standards by using a general bacterium (*Enterococcus faecium* ATCC 6057), an acid-fast bacteria (*Mycobacterium terrae* ATCC 15755), spores (*Bacillus subtilis* ATCC 19659), and a virus (poliovirus type 1 Sabin strain (LS-c, 2ab strain)/host cells: African green monkey kidney cell JCRB 9013) as microorganisms.

(1) Preparation of Test Composition

The components listed in Table 10 were dissolved in synthetic hard water to give the concentration and pH indicated in Table 10, thereby preparing test compositions (Examples 7-1 to 7-3).

(2) Preparation of Microbial Solutions (a) General Bacteria

A glycerol stock of *Enterococcus faecium* ATCC 6057 was inoculated in a trypticase soy agar medium ("TSA medium" below) and cultured at 37° C. After culture, a diluent (0.85% NaCl and 0.1% tryptone peptone-containing aqueous solution, "diluent 1" below) was added, and the medium was scraped. The obtained microbial solution was placed in a 50-mL centrifuge tube, and 5 g of sterile glass beads was added, followed by stirring for 1 minute. After stirring, only the microbial solution was collected in another centrifuge tube. After centrifugation, the supernatant was removed, and the microbial solution was resuspended with the diluent.

(b) Acid-Fast Bacterium

A glycerol stock of *Mycobacterium terrae* ATCC 15755 was inoculated in a medium (*Mycobacteria* 7H11 agar+10% OADC enrichment medium, "7H11 medium" below) and cultured at 37° C. After culture, the bacterium was scraped off and collected in a 50-mL centrifuge tube containing sterile glass beads. Sterile distilled water was added to the tube, and the mixture was stirred and diluted accordingly. The diluted mixture was allowed to stand, and then the microbial solution in the middle layer was collected.

(c) Spores

A glycerol stock of *Bacillus subtilis* ATCC 19659 was inoculated in an NB medium (Nutrient Broth No. 2), cultured at 37° C., and passaged into a sporulation medium plate, followed by culture at 37° C. After culture, sterile water was poured to scrape off the bacterium, and the scraped bacterium was then placed in a 50-mL centrifuge tube containing sterile glass beads and stirred, followed by filtration through sterile gauze. After centrifugation, an operation of washing the filtrate with sterile water and centrifugation of the filtrate was performed three times, followed by resuspension with sterile water. The resulting product was heated at 80° C. for 15 minutes, thereby preparing a microbial solution.

(d) Virus

A cryopreserved solution of poliovirus type 1 Sabin strain was diluted and inoculated in a cell culture plate. An FBS-containing MEM medium was added, and culture was performed at 37° C. in 5% $CO_2$, followed by scraping the cells to collect the culture broth. The collected culture broth was subjected to a freeze-thaw cycle at −80° C. three times, and the obtained culture broth was centrifuged to collect the supernatant, thereby preparing a microbial solution.

(3) Evaluation Test for Microbicidal Effect (a) General Bacteria: EN 13727:2012/Dirty Conditions (i) A test composition kept at 35° C. beforehand, a microbial solution, and an interfering substance under dirty conditions (3% BSA+3% red blood cells: the same below) are mixed in a ratio of 8:1:1, and allowed to act at 35° C.

(ii) After action for 5 minutes, a neutralizer (0.1% sodium thiosulfate, catalase) is added to inactivate the mixture solution.

(iii) The inactivated mixture solution is applied to the surface of a TSA medium and cultured at 37° C.

(iv) After one day from culture, the number of microorganisms is counted.

(v) In accordance with the requirements of EN 13727: 2012, a log reduction value of microbial counts before and after the test being 6 $Log_{10}$ or higher is determined to be "A: having an effective microbicidal effect," and otherwise determined to be "B: having no effective microbicidal effect."

(b) Acid-Fast Bacteria: EN 14348:2005/Dirty Conditions (i) A test composition kept at 35° C. beforehand, a microbial solution, and an interfering substance are mixed in a ratio of 8:1:1 and allowed to act at 35° C.

(ii) After action for 5 or 20 minutes, a neutralizer (0.1% sodium thiosulfate, catalase) is added to inactivate the mixture solution.

(iii) The inactivated mixture solution is applied to the surface of a 7H11 medium and cultured at 37° C.

(iv) After three weeks from culture, the number of bacteria is counted.

(v) In accordance with the requirements of EN 14348: 2005, a log reduction value of microbial counts before and after the test being 4 $Log_{10}$ or higher is determined to be "A: having an effective microbicidal effect," and otherwise determined to be "B: having no effective microbicidal effect."

(c) Spores: EN 17126:2018/Dirty Conditions or Clean Conditions (i) A test composition kept at 35° C. beforehand, a microbial solution, and an interfering substance under dirty conditions or clean conditions are mixed in a ratio of 8:1:1 and allowed to act at 35° C.

(ii) After action for 5 minutes (dirty conditions) or 20 minutes (clean conditions), a neutralizer (0.1% sodium thiosulfate, catalase) is added to inactivate the mixture solution.

(iii) The inactivated mixture solution is applied to the surface of a TSA medium and cultured at 37° C.

(iv) After one day from culture, the number of spores is counted.

(v) In accordance with the requirements of EN 17126: 2018, a log reduction value of microbial counts before and after the test being 4 $Log_{10}$ or higher is determined to be "A: having an effective microbicidal effect," and otherwise determined to be "B: having no effective microbicidal effect."

(d) Virus: EN 14476:2013/Dirty Conditions (i) A test composition and an interfering substance are kept at 35° C. beforehand. A virus solution and a neutralizer (10% FBS-containing MEM+0.5% sodium thiosulfate, catalase) are stored in ice.

(ii) The test composition, the virus solution, and the interfering substance are mixed in a ratio of 8:1:1 and allowed to act at 35° C.

(iii) After action for 5 minutes, the neutralizer is added to inactivate the mixture solution.

(iv) An original liquid (2% FBS-containing MEM) is diluted 10-fold stepwise to prepare diluents. Each diluent is dispensed into 8 wells of a 96-well microtiter plate (FBS-containing MEM medium) in which a host cell (African green monkey kidney cell JCRB9013) has been cultured beforehand, and the cells are cultured at 37° C. in the presence of 5% $CO_2$ for 1 hour.

(v) After one hour, the medium is removed, and a fresh medium is poured into each well, followed by culture at 37° C. in the presence of 5% $CO_2$.

(vi) After four days, the viral infectivity ($Log_{10}$ $TCID_{50}$) is calculated according to the Behrens-Karber method.

(vii) In accordance with the requirements of EN 14476: 2013, a log reduction value of viral infectivity before and after the test being 4 $Log_{10}$ or higher is determined to be "A: having an effective microbicidal effect," and otherwise determined to be "B: having no effective microbicidal effect."

(4) Evaluation Results of Microbicidal Effect
Table 10 also shows the results.

TABLE 10

Concentration (mass %) in Test Composition (Aqueous Solution)

| Component | | Example 7-1[1] | Example 7-2[1] | Example 7-3[2] |
|---|---|---|---|---|
| Peracetic Acid | | 0.05 | 0.07 | 0.03 |
| Hydrogen Peroxide | | 0.08 | 0.11 | 0.045 |
| Glycine | | 0.06 | 0.08 | 0.036 |
| Dipotassium Hydrogen Phosphate | | 0.02 | 0.02 | 0.01 |
| Tetrasodium Hydroxyethane Diphosphonate[\*1] | | 0.01 | 0.01 | 0.005 |
| Dipropylene Glycol[\*2] | | 0.05 | 0.07 | 0.03 |
| pH Adjuster[\*3] | | Moderate Amount | Moderate Amount | Moderate Amount |
| Total with Synthetic Hard Water | | 100 | 100 | 100 |
| pH | | 6 | 6 | 6 |
| Microbicidal Effect | E. faecium | A | — | — |
| | M. terrae | A | — | A |
| | B. subtilis | A | — | A |
| | Polio virus | — | A | — |

[\*1]Chelating Agent
[\*2]Stabilizer
[\*3]Potassium Hydroxide or Citric Acid
In the table, "—" indicates that no evaluation was made.
[1]Sterilization Conditions: 35° C., Action for 5 minutes
[2]Sterilization Conditions: 35° C., Action for 20 minutes As shown in Table 10, the microbicidal composition according to the present invention used as a test composition was confirmed to have an effective microbicidal effect on a wide range of microorganisms such as general bacteria, acid-fast bacteria, spores, and viruses. Among them, acid-fast bacteria, especially spores, are microorganisms that are highly resistant to disinfectants. However, because the microbicidal composition according to the present invention was confirmed to have an effective microbicidal effect on these microorganisms even at a low concentration, the microbicidal composition is considered to be a useful microbicidal composition that has an effective microbicidal effect at a low concentration on a wide range of microorganisms.

Experimental Example 4: Evaluation of Microbicidal Effect on Various Microorganisms (No. 2)

The microbicidal effect of the microbicidal composition according to the present invention was evaluated in the same manner as in Experimental Example 3 by performing microbicidal treatment at 20° C. for 5 minutes according to the test method prescribed in EN 17126:2018 (clean conditions) using spores (B. subtilis) used in Experimental Example 3 as a microorganism.

Table 11 shows the formula of the test composition (Example 8-1) and its microbicidal effect.

TABLE 11

Concentration (mass %) in Test Composition (Aqueous Solution)

| Component | Example 8-1 |
|---|---|
| Peracetic Acid | 0.20 |
| Hydrogen Peroxide | 0.30 |
| Glycine | 0.24 |

TABLE 11-continued

Concentration (mass %) in Test Composition (Aqueous Solution)

| Component | Example 8-1 |
|---|---|
| pH Adjuster[\*1] | Moderate Amount |
| Total with Synthetic Hard Water | 100 |
| pH | 6 |
| Microbicidal Effect   B. subtilis | A |

[\*1]Potassium Hydroxide or Citric Acid

As shown in Table 11, the microbicidal composition according to the present invention used as a test composition was confirmed to have an effective microbicidal effect on spores that are highly physicochemically resistant in a treatment at room temperature of 20° C.

Experimental Example 5: Microbicidal Effect Under Detergent Contamination Conditions Microbicidal treatment (disinfection treatment) of critical, semi-critical, and non-critical instruments is generally preceded by washing with a detergent and rinsing with water. However, if these operations are performed inside equipment or if the rinsing is not sufficiently performed after washing, the detergent could be brought into the microbicidal treatment process.

Thus, the impact of detergent contamination on the microbicidal effect of the microbicidal composition was evaluated, assuming detergent contamination.

(1) Test Method
(a) Evaluation Test 1

A detergent was added to test compositions adjusted to a pH of 4 (Examples 9-1 to 9-3, Comparative Examples 9-1 to 9-3) so as to give a final concentration of 0.01%, and the test compositions contaminated with the detergent were kept at 35° C. The detergent concentration (0.01%) was determined based on the assumption that contamination with 2% of the entire washing solution for use in the washing step occurred in the microbicidal treatment process. Table 12 shows the formulas of the test compositions.

Immediately after addition of the detergent (initial) and after 30 minutes of warming, the peracetic acid concentration of the test compositions contaminated with the detergent was measured, and the residual percentage of the peracetic acid was calculated according to the following formula. A residual percentage of 90% or higher was determined to be "A (microbicidal effect under detergent contamination conditions: good), and a residual percentage of less than 90% was determined to be "B (poor)."

The residual percentage (%)=(the peracetic acid concentration after 30 minutes of warming/the initial peracetic acid concentration)×100

(b) Evaluation Test 2

A detergent was added to test compositions adjusted to a pH of 6 (Example 10-1 and Comparative Example 10-1) so as to give a final concentration of 0.05%, and the test compositions contaminated with the detergent were kept at 35° C. The detergent concentration (0.05%) was determined based on the assumption that contamination with 10% of the entire washing solution for use in the washing step occurred in the microbicidal treatment process. Table 13 shows the formulas of the test compositions.

As in Evaluation Test 1, immediately after addition of the detergent (initial) and after 30 minutes of warming, the peracetic acid concentration of the test compositions contaminated with the detergent was measured. The residual percentage of the peracetic acid was calculated, and the microbicidal effect under detergent contamination conditions was evaluated.

(2) Test Results

Tables 12 and 13 show the results of Evaluation Tests 1 and 2.

As noted above, the microbicidal composition according to the present invention, which contains glycine in addition to peracetic acid and hydrogen peroxide, exhibits high stability of peracetic acid, and effective microbicidal action within the pH range from acidic to neutral even if a detergent is incorporated into the composition. Thus, the microbicidal composition according to the present invention is suitably usable in a manual disinfection operation, or, for example, in a disinfection operation using disinfection equipment provided with a disinfection chamber and a disinfectant delivery system.

TABLE 12

Concentration (mass %) in Test Composition (Aqueous Solution)

| Component | Example | | | Comparative Example | | |
| --- | --- | --- | --- | --- | --- | --- |
| | 9-1 | 9-2 | 9-3 | 9-1 | 9-2 | 9-3 |
| Peracetic Acid | 0.03 | 0.03 | 0.03 | 0.03 | 0.03 | 0.03 |
| Hydrogen Peroxide | 0.045 | 0.045 | 0.045 | 0.045 | 0.045 | 0.045 |
| Glycine | 0.036 | 0.036 | 0.036 | 0 | 0 | 0 |
| pH Adjuster*[1] | Moderate Amount | Moderate Amount | Moderate Amount | Moderate Amount | Moderate Amount | Moderate Amount |
| Total with Distilled Water | 100 | 100 | 100 | 100 | 100 | 100 |
| pH | 4 | 4 | 4 | 4 | 4 | 4 |
| Alkaline Detergent A*[2] | 0.01 | — | — | 0.01 | — | — |
| Alkaline Detergent B*[3] | — | 0.01 | — | — | 0.01 | — |
| Enzyme Detergent A*[4] | — | — | 0.01 | — | — | 0.01 |
| Determination | A | A | A | A | A | A |

*[1]pH Adjuster: KOH or Citric Acid
*[2]Alkaline Detergent A: Biotect DX, ultrasonic jet, Seller: Sakura Seiki Co., Ltd.
*[3]Alkaline Detergent B: EndoQuick, Seller: Olympus Corporation
*[4]Enzyme Detergent A: Power Quick, Multi-use Enzyme Cleaner, Manufacturer: Saraya Co., Ltd.

TABLE 13

Concentration (mass %) in Test Composition (Aqueous Solution)

| Component | Example 10-1 | Comparative Example 10-1 |
| --- | --- | --- |
| Peracetic Acid | 0.03 | 0.03 |
| Hydrogen Peroxide | 0.045 | 0.045 |
| Glycine | 0.036 | 0 |
| pH Adjuster*[1] | Moderate Amount | Moderate Amount |
| Total with Distilled Water | 100 | 100 |
| pH | 6 | 6 |
| Enzyme Detergent A*[2] | 0.05 | 0.05 |
| Determination | A | B |

*[1]pH Adjuster: KOH or Citric Acid
*[2]Enzyme Detergent A: Power Quick, Multi-use Enzyme Cleaner, Manufacturer: Saraya Co., Ltd.

The results of Evaluation Test 1 (Table 12) indicate that peracetic acid is stable when the pH is acidic; and that if the amount of the incorporated detergent is small, an effective amount of peracetic acid remains irrespective of whether glycine has been added, with no adverse effect on the microbicidal action. The results of Evaluation Test 2 (Table 13) indicate that peracetic acid becomes less stable when the pH value approaches from acidic to neutral, and that incorporation of a detergent further decreases the residual amount of peracetic acid (Comparative Example 10-1); but that even when a detergent is incorporated, an effective amount of peracetic acid remains in a test composition containing glycine (Example 10-2), with no adverse effect on the microbicidal action.

The invention claimed is:

1. A microbicidal composition comprising
   peracetic acid,
   hydrogen peroxide, and
   glycine,
   wherein
   the amount of the peracetic acid is 0.03 to 0.9 mass %, the amount of the hydrogen peroxide is 0.045 to 1.35 mass %, and the amount of the glycine is 0.036 mass % or more,
   the proportion of the hydrogen peroxide per 100 parts by mass of the peracetic acid is 100 to 200 parts by mass,
   the proportion of the glycine per 100 parts by mass of the peracetic acid is 80 to 180 parts by mass, and the proportion of the glycine per 100 parts by mass of the hydrogen peroxide is 50 to 120 parts by mass, and
   the microbicidal composition is in the form of an aqueous solution with a pH of 2 to 7.

2. The microbicidal composition according to claim 1, having a pH of 3 to 7.

3. The microbicidal composition according to claim 1, further comprising at least one auxiliary component selected from the group consisting of hydrogen phosphate, a chelating agent, and a pH buffer.

4. A method for disinfecting a test object, comprising treating the test object with the microbicidal composition of claim 3.

5. The method according to claim 4, comprising, before the treating the test object, mixing (A) a formulation containing peracetic acid and hydrogen peroxide and (B) a formulation containing glycine with an aqueous solvent to prepare the microbicidal composition.

6. The method according to claim 4, wherein the test object contains an adhesive.

7. The method according to claim 6, which is a method for disinfecting the test object while limiting a decrease in durability of the adhesive.

8. The microbicidal composition according to claim 3, which is a disinfectant and/or a microbicidal agent for a test object containing an adhesive, wherein the test object is an instrument or equipment for use in the medical or food field requiring disinfection or microbicidal treatment.

9. The microbicidal composition according to claim 1, which is a disinfectant and/or a microbicidal agent for a test object containing an adhesive, wherein the test object is an instrument or equipment for use in the medical or food field requiring disinfection or microbicidal treatment.

10. A method for preparing the microbicidal composition of claim 1, comprising mixing (A) a formulation containing peracetic acid and hydrogen peroxide and (B) a formulation containing glycine with an aqueous solvent to prepare an aqueous solution,
wherein
the aqueous solution contains 0.03 to 0.9 mass % of the peracetic acid, 0.045 to 1.35 mass % of the hydrogen peroxide, and 0.036 mass % or more of the glycine,
the proportion of the hydrogen peroxide per 100 parts by mass of the peracetic acid in the aqueous solution is 100 to 200 parts by mass, the proportion of the glycine per 100 parts by mass of the peracetic acid is 80 to 180 parts by mass in the aqueous solution, and the proportion of the glycine per 100 parts by mass of the hydrogen peroxide in the aqueous solution is 50 to 120 parts by mass, and
the aqueous solution has a pH of 2 to 7.

11. The method according to claim 10, wherein the formulation (B) further contains at least one auxiliary component selected from the group consisting of hydrogen phosphate, a chelating agent, and a pH buffer.

12. A combination formulation comprising
(A) a formulation containing peracetic acid and hydrogen peroxide, and
(B) a formulation containing glycine,
wherein
the formulation (A) and the formulation (B) are mixed with an aqueous solvent to prepare an aqueous solution before use, the aqueous solution containing 0.03 to 0.9 mass % of the peracetic acid, 0.045 to 1.35 mass % of the hydrogen peroxide, and 0.036 mass % or more of the glycine,
the proportion of the hydrogen peroxide per 100 parts by mass of the peracetic acid in the aqueous solution is 100 to 200 parts by mass, the proportion of the glycine per 100 parts by mass of the peracetic acid in the aqueous solution is 80 to 180 parts by mass, and the proportion of the glycine per 100 parts by mass of the hydrogen peroxide in the aqueous solution is 50 to 120 parts by mass, and
the aqueous solution has a pH of 2 to 7.

13. The combination formulation according to claim 12, wherein the formulation (B) further contains at least one auxiliary component selected from the group consisting of hydrogen phosphate, a chelating agent, and a pH buffer.

14. A method for disinfecting a test object, comprising treating the test object with a microbicidal composition comprising
peracetic acid,
hydrogen peroxide, and
glycine,
wherein
the amount of the peracetic acid is 0.03 to 0.9 mass %, the amount of the hydrogen peroxide is 0.045 to 1.35 mass %, and the amount of the glycine is 0.036 mass % or more,
the proportion of the hydrogen peroxide per 100 parts by mass of the peracetic acid is 100 to 200 parts by mass, the proportion of the glycine per 100 parts by mass of the peracetic acid is 80 to 180 parts by mass, and the proportion of the glycine per 100 parts by mass of the hydrogen peroxide is 50 to 120 parts by mass, and
the microbicidal composition is in the form of an aqueous solution with a pH of 2 to 7.

15. The method according to claim 14, comprising, before the treating the test object, mixing (A) a formulation containing peracetic acid and hydrogen peroxide and (B) a formulation containing glycine with an aqueous solvent to prepare the microbicidal composition.

16. The method according to claim 14, wherein the test object contains an adhesive.

17. The method according to claim 16, which is a method for disinfecting the test object while limiting a decrease in durability of the adhesive.

* * * * *